United States Patent [19]
Trabucco, Jr.

[11] Patent Number: 5,831,190
[45] Date of Patent: Nov. 3, 1998

[54] APPARATUS FOR IDENTIFYING THE NOTE OF AN AUDIO SIGNAL

[76] Inventor: William R. Trabucco, Jr., 28 Rawson Rd., Dorchester, Mass. 02124

[21] Appl. No.: 900,381

[22] Filed: Jul. 20, 1997

Related U.S. Application Data

[63] Continuation of Ser. No. 557,569, Nov. 14, 1995, abandoned.

[51] Int. Cl.⁶ .................................................. G09B 15/02
[52] U.S. Cl. .......................................................... 84/477 R
[58] Field of Search ................................ 84/454, 470 R, 84/477 R, 466

[56] References Cited

U.S. PATENT DOCUMENTS 3,722,352  3/1973  Ihrke et al. ................................ 84/454
4,457,203  7/1984  Schoenberg et al. ..................... 84/454
5,056,398  10/1991 Adamson .................................. 84/454
5,557,056  9/1996  Hong et al. ............................... 84/610

Primary Examiner—William M. Shoop, Jr.
Assistant Examiner—Shih-yung Hsien

[57] ABSTRACT

An apparatus for identifying the note of an audio signal is disclosed having a transducer, an electronic logic determining structure, and a display for displaying the note of the input signal. The apparatus further includes a note programmer that enables a user to select one or more notes to be displayed on the note display. A cent array may also be included to visually show the deviation from the displayed note.

18 Claims, 3 Drawing Sheets

APPARATUS FOR IDENTIFYING THE NOTE OF AN AUDIO SIGNAL

This is a continuation, of application Ser. No. 08/557,569, filed Nov. 14, 1995, now abandoned.

FIELD OF THE INVENTION

This invention relates generally to a audio note identifying device, and more particularly concerns a practice device for training a person's voice.

BACKGROUND OF INVENTION

It is known that when a musician or other person sings a note, a sound pressure waveform is established in the air around the musician. The waveform is periodic in time and can ideally be represented by a number of superimposed, interrelated sine waves. One of those waves has a "fundamental" frequency that is perceived as the pitch or note of the sound. A number of sine waves having frequencies that are integer multiples of the fundamental frequencies are also included in the waveform. These additional sine waves are commonly referred to as "harmonics" or "overtones". Even with harmonics present, the pitch of the note is perceived to be the fundamental frequency of the waveform and, therefore, it is this frequency that is of interest.

There are fifteen major scales in common use with fifteen tonics or keynotes, the key signatures for the major scales being C, G, D, A, E, F, B flat, E flat, A flat (harmonic keys) and B, F#, C#, D flat, G flat, and C flat (enharmonic keys). Only twelve possible different keys are existent, however, since the harmonic tones or keys, C#-D flat, F#-G flat, and B-C flat actually have the same pitch. In addition, each note has a plurality of tones (having slightly different frequencies) known as "cents" associated with it that represent a set of frequencies just higher or just lower than the note. Since there are 100 cents between each note, the fifty cents "lower than" the note are flatter than the note, and the fifty cents "higher than" the note are sharper than the note. Any cent frequencies that are greater than fifty cents above or below a note are by definition deemed to be associated with the tone of the immediately preceding or succeeding note, as the case may be.

When teaching an untrained music pupil to sing, it is frequently difficult for such a pupil to read music and then make a voice sound of exactly the right pitch corresponding to each of the notes that he reads. In fact, even highly trained singers need to continually train both their voice and ear to maintain a high level of singing performance. It is therefore desirable for a singer to develop a natural recognition of the note that he is singing.

Many methods of training a music pupil's voice have been used. A first method merely compares the tone of the pupil's voice to the tone of an instrument or other device that is known to be set at a particular note or tone. Although this method does provide some immediate feedback, such feedback is not exact and subject to interpretation.

A second method of vocal training provides an immediate visual indication of the note being sung by the pupil upon a visual display. None of these devices, however, enable a user to select specific notes or groups of notes to focus upon while training.

Accordingly, there is a great need for a device that would enable a student to instantaneously and continuously monitor the notes that such student sings upon a user-friendly visual display. The device would preferably enable a user to select specific notes or groups of notes to focus upon while training.

SUMMARY OF INVENTION

It is therefore an object of this invention provide a vocal training device that gives the user an instantaneous visual indication of the note and cent that is being sung.

It is another object of this invention to provide a vocal training device that enables a user to select specific notes or groups of notes to focus upon while training.

It is also an object of this invention to provide a vocal training device that is easy to use.

This invention results from the realization that vocal training can be facilitated when a person singing is able to obtain an instantaneous indication of the note that he is singing, and is also able to select specific notes or groups of notes to focus upon while training.

The above and other objects are achieved in accordance with the present invention which, according to a first aspect, provides an apparatus for identifying the note of an audio signal. The apparatus comprises a transducer for converting the audio signal into an electrical signal, a means for determining the note of the electrical signal, a display for displaying the note of the electrical signal (which is the same frequency as the audio signal), and a means for causing the display to display no more than one or more preselected notes on the musical scale.

Prior to or during use, a user is able to select a single note which the display shall display. No other notes will be displayed. The user then sings into the transducer, which typically is a conventional microphone, and sees no other note on the screen other than the preselected note. The preselected note is only displayed on the display, however, when it is actually received by the determining means.

BRIEF DESCRIPTION OF THE DRAWINGS

Other objects, features, and advantages of this invention will occur to those skilled in the art from the following description of a preferred embodiment and the accompanying drawings, in which.

DISCLOSURE OF PREFERRED EMBODIMENT

Figure 1:
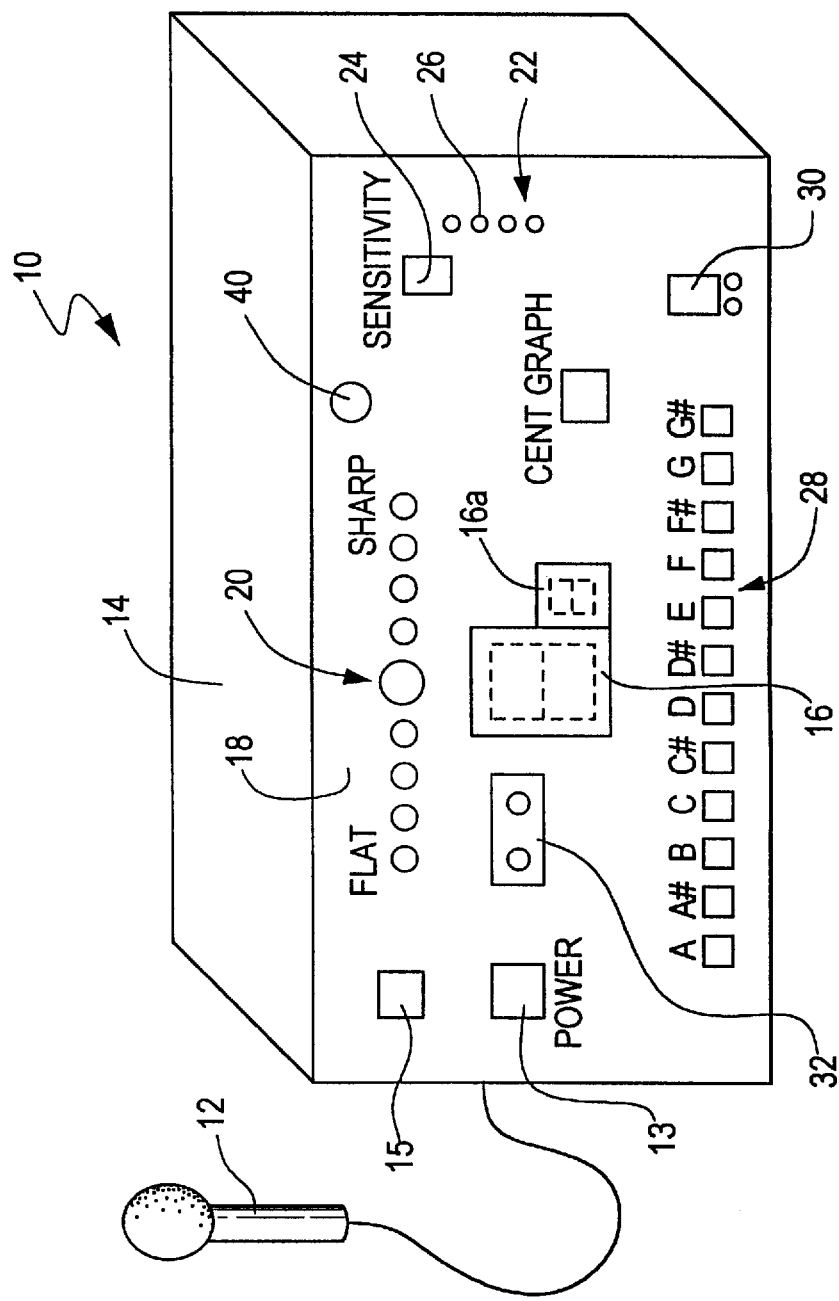
FIG. 1 is a schematic drawing of a preferred embodiment of the apparatus for identifying the note of an audio signal.

FIG. 1 shows a schematic drawing of a preferred embodiment of a vocal practice device 10. The device has a housing 14 that contains all of the user interfaces and internal electronics. A conventional external microphone 12 may be connected to transmit audio signals to the device 10. Alternatively, an internal microphone (not shown) may be mounted directly in the device 10 to receive the audio signals. A power button 13 enables a user to turn the device 10 on and off.

A note display 16 to selectively display the note sung into the microphone 12 is mounted upon the front face 18 of the device 10 and provides an easily viewable visual output. The note display 16 preferably is a light emitting diode ("LED") display, although any known display device would suffice. In particular, a liquid crystal display would produce similar output. A cent array 20 is positioned just above the note display 16 to show the deviation from the central harmonic note. The cent array 20 preferably is made of differing colored LED's that each show a cent deviation from +/−50 cents. Conventional light elements having no color, or any other known display elements may also be used for the cent array 20. Again, a liquid crystal display would suffice. In the preferred embodiment, the cent array includes a center light (representing +10 to −10 cents), and four lights on each side of the center light. Each individual light to the right of the center light, for example, can be programmed to be +10 to +20 cents, +20 to +30 cents, +30 to +40 cents, and +40 to +50 cents, respectively. Each individual light to the left of the center light, for example, can be programmed to be −10 to −20 cents, −20 to −30 cents, −30 to −40 cents, and −40 to −50 cents, respectively. A cent graph disabler 15 is also included to give the user the ability to enable and disable the cent array 20. The display 16 may also include an octave output display 16a which shows the octave of the note.

The device 10 includes a plurality of programming functions. In particular, the note sensitivity as displayed on the cent array 20 may be programmed by a sensitivity selector 22. In the preferred embodiment, the sensitivity selector 22 comprises a button 24 and a plurality of light elements 26. By pushing the button 24, one or more of the plurality of light elements 26 will be illuminated to indicate a programming state. By way of example, one push may disable only the +/−50 cent light on the cent array 20. Two successive pushes on the button 24 may disable both the +/−40 and +/−50 cent lights on the cent array 20. Three successive pushes on the button 24 may disable each of the +/−30, +/−40, and +/−50 lights on the cent array 20. Additional light disabling configurations may be programmed into the sensitivity selector 22 that are easily manipulatable by a user.

In a preferred embodiment of the invention, the cent array 20 may be programmable to display only a predetermined range of cents on the array 20. For example, a user may program the device 10 to display only +/−30 to +/−0 cents from the note being sung. Additionally, the device 10 may be programmed to coordinate the lighting of the note display 16 and the cent array 20 during operation of the device 10.

The device 10 further includes a note programmer 28 that enables a user to select one or more notes to be displayed on the note display 16. The note programmer 28 includes, in the preferred embodiment, twelve buttons 30 that each represent one of twelve notes between A and G#. When a user pushes a particular button, that note associated with that button will not be displayed on the note display 16 at any time. Alternatively, the note programmer 28 may be coordinated to display only the notes that are selected. For example, when a user pushes the A, B, and C buttons on the note programmer 28, only the notes A, B, and C will be shown on the note display 16 (when the device 10 receives an audio waveform that represents those notes). No other notes will be displayed on the note display 16. The note programmer may be any type of selection system, such as an analog dial, voice recognition processor, or heat sensing liquid crystal display known in the art.

As suggested above, the device 10 may be configured to not display one or more preselected notes that are selected by a user. For example, a user may select notes A and B as notes to be in an "exclusion set" (i.e. a set of one or more notes that are not to be displayed). Accordingly, all of the notes on the musical scale will be displayed on the display 16 except for notes A and B. The device 10 may be further be programmed to not show the notes in the exclusion set only when they are within a preselected set of cents. When the note is outside of the preselected set of cents, the device 10 will thus display the note and cent of the note on the note display 16 and cent display 20, respectively.

As an annex to the note programmer 28, a note group selector 30 may be included to add further features to the device 10. By using the note group selector 30, a user may program two or more sets of notes into an internal memory of the device 10. The note group selector 30 enables a user to instantaneously select alternative groups of preselected notes for display on the note display 16. For example, a user may be able to store the notes A and B in a first memory location, and the notes C and D in a second memory location. The user may then select the first set of notes (A and B) and will only see those two notes on the display when they are sung. The user may then at any time select the second set of notes (C and D) and will then only see those two notes on the display when they are sung. In a preferred embodiment, the user is also able to simultaneously select both the first and second sets of notes.

The device 10 may also be configured to only display notes that are sung within a certain key of the musical scale. Accordingly, an alternative embodiment of the device 10 includes a music input 40 that receives a musical melody from a source and determines the key of the melody. The display 16 will then only display those notes received from the microphone 12 that are in the same key as the melody.

An internal or external recording device 32 may be included to record the audio signals that are being analyzed by the device 10. In an alternative embodiment, a recording device may also be included that records both the input and output of the device. Any conventional recording apparatus known in the art may be used.

The internal electronic configuration may be either or a combination of the teachings of U.S. Pat. No. 5,070,754 to Adamson, U.S. Pat. No. 4,688,464, and/or U.S. Pat. No. 4,441,399, each of which being incorporated herein by reference. Since any electronic configuration known in the art may be used, the above references are included to be merely exemplary of typical configurations. The device 10 may be either or both software or hardware driven. Accordingly, the invention may be practiced either entirely on a conventional computer (in connection with an application program that effectuates most or all of the features of the invention), or it may be practiced as a device wholly dedicated to effectuating the features of the invention. In the latter configuration, a processor or logic microchip may be programmed by conventional techniques to effectuate each of the device features.

Figure 2:
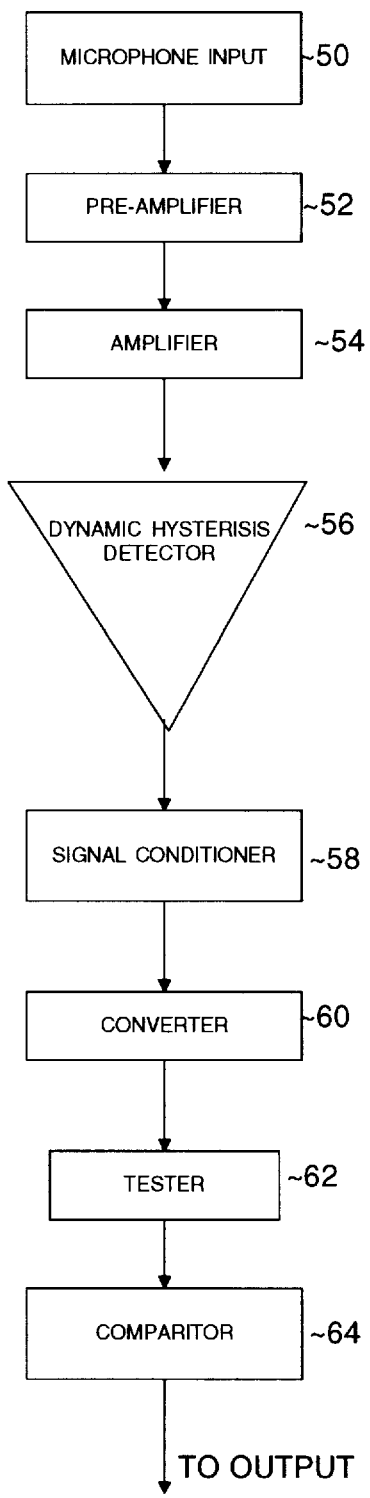
FIG. 2 is a flow chart of an exemplary internal electronic configuration of the preferred embodiment.
Figure 2A:
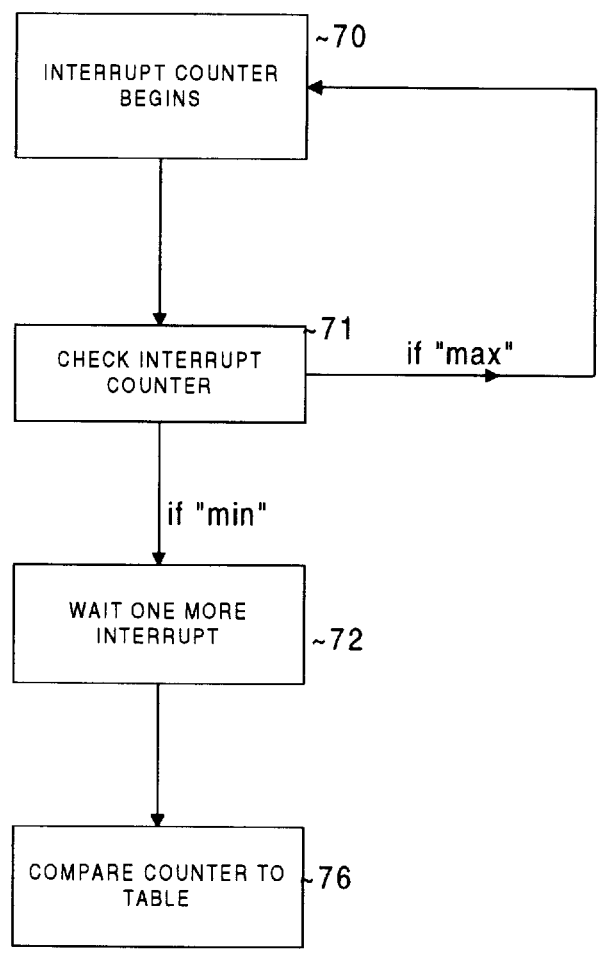
FIG. 2A is a flow chart of an exemplary conversion of a conditioned signal to octave, tone, and cent output.

FIG. 2 shows a flow chart of one particular internal electronic configuration that has proven to yield satisfactory results. A signal is received by an XLR microphone input 50 and amplified by a pre-amplifier 52 and an amplifier 54. The signal is then passed to a dynamic hysterisis detector 56 having a range of 50 to 5,000 cycles/second to the frequency of a "whisper". The signal is then passed to a signal conditioner 58 where some computer interrupts need a pulse rather than an edge for consistent timing. An octave, tone, and cent converter 60 then process the conditioned signal. The converter 60 follows the algorithm as shown in FIG. 2A (discussed below). A tester 62 then tests for and outputs a stable signal. When the same tone has been sampled a select number of times, it is then presented to a comparitor 64 which compares to a program, sensitivity, and cent graph selection and display. Output is filtered according to user selection and displayed to the user.

FIG. 2A shows the processing of the conditioned signal. The counter begins at interrupt 70. At step 71, it checks interrupt counter if at the next interrupt the counter is less than a preset "min" value, then it executes a "wait" 72 for one more interrupt (then 2,4,8,16,32,64, or 128) to determine the octave. If at the next interrupt the counter is more than a preset "max" value, then it returns to interrupt counter begin 70. At step 76, the counter value is compared to a table of −50 cents "A" through +50 cents "G sharp".

When in use, a user is able to select one, all, or a combination of notes which are to be shown on the note display 16. No other notes other than those selected will be displayed. The user then sings into the microphone 12 and views only the selected note(s). The selected note(s) are only displayed on the note display 16, however, when they are actually received by the means for determining the note of the audio waveform within the internal mechanisms of the device 10. The user may also activate the sensitivity selector 24 to program the cent array 20 to show anywhere from 0 to +/−50 cents from the central frequency. Moreover, the user may also activate the note group selector 30 to alternatively show one of a plurality of sets of preselected note sets.

As should be apparent from the foregoing, use of the device 10 facilitates vocal training by providing a user-friendly visual display that reacts instantaneously to a change in tone of the voice. In addition, the programming features enable a user to focus upon one or more specific notes, further strengthening the utility of the device 10.

Although the device 10 has been discussed primarily as a vocal trainer, it may be used in a variety of different uses known in the art. Such uses may include, for example, tuning instruments, training musicians who use horns or other brass instruments, musical education, entertainment, and other uses known in the art.

Although specific features of this invention are shown in some drawings and not others, this is for convenience only as some feature may be combined with any or all of the other features in accordance with this invention.

The foregoing is considered as illustrative only of the principles of the invention. Furthermore, since numerous modifications and changes will readily occur to those skilled in the art, it is not desired that the foregoing limit the invention to the exact construction and operation shown and described. Accordingly, all suitable modifications and equivalents may be resorted to that appropriately fall within the scope of the invention. Other embodiments therefore will occur to those skilled in the art and are within the scope of following claims:

I claim:

1. An apparatus for identifying the note of an audio signal, the note being represented by a frequency range in each of the audible octaves, the frequency range in each audible octave having a center frequency and a cent range, the apparatus comprising:
    a transducer means for converting the audio signal into an electrical signal;
    means responsive to the electrical signal for determining the note of the electrical signal where the electrical signal has the same note as the audio signal;
    means for detecting the center frequency of the electrical signal;
    a display for displaying the note of the electrical signal;
    means for selecting a preselected note, the preselected note being represented by a frequency range in each of the audible octaves, the frequency range in each audible octave having a center frequency and a cent ranges; and
    means for causing the display to display no more notes than the preselected note, the preselected note being displayed each time one of the center frequencies associated with the preselected note is detected by the detecting means.

2. The apparatus as defined by claim 1 further including a means for recording the audio signal.

3. The apparatus as defined by claim 1 wherein the determining means determines the note of the electrical signal every fifteen to twenty-five milliseconds.

4. The apparatus as defined by claim 1 wherein the determining means includes means for determining the cent of the electrical signal.

5. The apparatus as defined by claim 4 further including a cent array for displaying the cent of the electrical signal.

6. The apparatus as defined by claim 5 further including a means for causing the cent array to display only a preselected range of cents.

7. The apparatus as defined by claim 1 wherein the display means includes a light emitting diode display.

8. The apparatus as defined by claim 1 wherein the transducer means includes a microphone.

9. The apparatus as defined by claim 1 further including a means for alternatively causing the display to display no more notes on the musical scale than those notes in one of a plurality of sets of preselected notes on the musical scale.

10. The apparatus as defined by claim 1 further including means for causing the display to display the octave of the note.

11. An apparatus for identifying the note of an audio signal, the note being represented by a frequency range in each of the audible octaves, the frequency range in each audible octave having a center frequency and a cent range, the apparatus comprising:
    a transducer means for converting the audio signal into an electrical signal;
    means for determining the note of the electrical signal where the note of the electrical signal is the same as the note of the audio signal;
    means for detecting the center frequency of the electrical signal;
    a display for displaying the note of the electrical signal;
    means for selecting a first preselected note, the first preselected note being represented by a first frequency range in each of the audible octaves, the first frequency range in each audible octave having a center frequency and a cent range;
    means for selecting a second preselected note, the second preselected note being represented by a second frequency range in each of the audible octaves, the second frequency range in each audible octave having a center frequency and a cent range;
    means for enabling a user to select between the first preselected note and the second preselected note; and
    means for causing the display to display no more notes than one of the first preselected note or the second preselected note,
    The first preselected note being displayed, responsive to the user note switching means, each time one of the center frequencies associated with the first preselected note is detected by the detecting means,
    the second preselected note being displayed, responsive to the user note switching means, each time one of the center frequencies associated with the second preselected note is detected by the detecting means.

12. The apparatus as defined by claim 11 wherein the determining means determines the note of the electrical signal every fifteen to twenty-five milliseconds.

13. The apparatus as defined by claim 11 wherein the determining means includes means for determining the cent of the electrical signal.

14. The apparatus as defined by claim 13 further including a cent array for displaying the cent of the electrical signal.

15. The apparatus as defined by claim 14 further including a means for causing the cent array to display only a preselected range of cents.

16. An apparatus for identifying the note and cent of an audio signal, the note being represented by a frequency range in each of the audible octaves, the frequency range in each audible octave having a center frequency and a cent range, the apparatus comprising:

- a transducer means for converting the audio signal into an electrical signal;
- a means for determining the note of the electrical signal where the note of the electrical signal is the same as the note of the audio signal;
- means for detecting the center frequency of the electrical signal;
- a display for displaying the note and cent of the electrical signal;
- means for selecting a preselected note, the preselected note being represented by a frequency range in each of the audible octaves, the frequency range in each audible octave having a center frequency and a cent range; and
- means for causing the display to display no more notes than the preselected note, the preselected note being displayed each time one of the center frequencies associated with the preselected note is detected by the detecting means,
- means for selecting a preselected cent range; and
- means for causing the display to display only the preselected cent range.

17. The apparatus as defined by claim 16 wherein the preselected range of cents is between +/−50 cents to 0 cents.

18. The apparatus as defined by claim 16 further including a means for alternatively causing the display to display no more notes on the musical scale than those notes in one of a plurality of sets of preselected notes on the musical scale.

\* \* \* \* \*